2,890,753
WELL DRILLING COMPOSITION AND METHOD

Chester N. White, Ridley Park, Pa., assignor to Sun Oil Company, Philadelphia, Pa., a corporation of New Jersey No Drawing. Application March 2, 1956
Serial No. 568,961

5 Claims. (Cl. 166—42)

This invention relates to the drilling of oil or gas wells by the rotary method, and more particularly to novel drilling fluids for use in the production of crude petroleum, and to the regulation of the characteristics of such drilling fluid.

It is known in the art to employ various types of drilling fluids in the production of crude petroleum, the functions of the drilling fluid including the lubrication and cooling of the drilling bit, the suspension and carrying of cuttings out of the well, and other functions as well known in the art. The drilling fluids previously used include non-emulsion aqueous muds, oil base muds, and emulsion muds which may be regarded as a mixture of oil and aqueous mud. The present invention relates to an oil-containing mud of either the straight oil base type or the emulsion type.

A straight oil base drilling fluid generally contains a water-immiscible liquid material, finely divided solid material suspended therein, and a stabilizing material to help maintain the solids in a satisfactory state of suspension in the liquid. The most commonly used liquid for an oil base fluid is mineral oil, for example crude oil or a suitable fraction such as gas oil. Oil base muds may also contain blown asphalt in order to decrease fluid loss and provide other desirable properties.

Emulsion drilling fluids also contain a water-immiscible liquid and a stabilizing material, but differ from the straight oil base fluid in being a mixture of oil with an aqueous drilling mud. Usually the water will be the continuous phase in the emulsion fluid, the water-immiscible fluid such as mineral oil being the disperse phase.

Viscosity and gel strength are important properties in oil base and emulsion muds, and it is desirable to be able to control these properties, not only in the initial preparation of the mud, but also at any time during the use of the fluid, when these properties may be impaired as a result of conditions encountered during the use, or at any time when for any other reason it is desired to change the viscosity and gel strength. The present invention provides a manner of controlling viscosity and gel strength in the initial preparation of the fluid and of varying viscosity and gel strength in accordance with changed conditions.

These functions are accomplished according to the invention by employing as a stabilizing material a particular fraction of oxidation products obtained by liquid phase partial oxidation of petroleum. The fraction employed comprises carboxyl-containing products of oxidation, and these may be employed in the fluid either in the free acid form or in saponified form, i.e. as alkali metal salts for example. The acidic material employed in the drilling fluid is obtained by a separation of carboxyl-containing products of partial oxidation into at least two fractions. One or more of these fractions is then incorporated in the drilling fluid. If more than one fraction is incorporated, the proportions of the various fractions are different in the drilling fluid from the proportions of those fractions in the oxidation products prior to separation.

In liquid phase partial oxidation of petroleum, a variety of products are obtained including carboxylic acids and esters thereof, as well as unsaponifiable oxidation products of various kinds, such as aldehydes, ketones, alcohols, etc. The carboxylic acids produced vary widely in their extent of oxidation and final composition, and include monocarboxylic acids, polycarboxylic acids, hydroxy acid, aldehyde acids, keto acids, etc. These acids differ widely among themselves in their acid strength, the more highly oxygenated acids being in general stronger than the less highly oxygenated acids. According to the present invention, the stronger acids are separated from the weaker acids, and the fractions obtained are incorporated in a drilling fluid in the manner previously described.

The strong acids, particularly when employed in saponified form, usually impart to a drilling fluid higher viscosity and gel strength than the weak acids. Accordingly, where low viscosity is desired, the weak acids or a blend predominating in such acids can be used as stabilizing material to provide this property. On the other hand, where it is desired to increase the gel strength, the strong acids can be employed, or a blend predominating in such acids.

Any suitable petroleum fraction can be employed as charge stock for the liquid phase partial oxidation which produces the acidic materials employed according to the invention. Preferably, the charge stock is a distillate material having Saybolt Universal viscosity at 100° F. within the approximate range from 125 to 200 seconds. However, any petroleum fraction which can be oxidized to produce carboxylic acids having for example 10 or more carbon atoms in the molecule, can be employed in the partial oxidation. The aromatic hydrocarbon content of the oxidation charge should be sufficiently low that the oxidation proceeds satisfactorily. Aromatic hydrocarbons in general have an inhibiting effect on the oxidation, and preferably the weight percent of compounds containing an aromatic ring in the molecule is less than 20 weight percent, and more preferably less than 15%. Suitable charge stocks can thus be obtained for example by refining with a selective solvent for aromatics, or by sulfuric acid treatment, etc. Suitable charge stocks include oils, waxes such as paraffin, petrolatum, ceresin, mixtures of oils and waxes, etc.

The oxidation is performed under any conditions suitable for providing a substantial yield of carboxylic acid products, including more highly oxygenated carboxylic acids in addition to the simple monocarboxylic acids. Preferably, the oxidation is continued until the saponification number of the total nongaseous oxidation product is within the approximate range from 30 to 150 mg. of KOH per gram, and more preferably within the range from 100 to 120 mg. of KOH per gram. Oxidation to an excessively high saponification number may result in the production of too much highly oxygenated product in relation to the amount of the less highly oxygenated, weaker acid products. On the other hand, the oxidation should proceed far enough to produce at least substantial amounts of the more highly oxygenated acidic products.

Preferred temperatures for the partial oxidation are those within the approximate range 120 to 165° C. Preferred pressures are those within the approximate range from atmospheric pressure to 200 p.s.i.g. Any suitable oxidizing agent can be employed including oxygen-containing gas such as air, pure oxygen, ozonized air, etc., as well as other oxidizing agents such as hydrogen peroxide, hypochlorites, etc. An oxidation catalyst can be employed, and the use of such catalyst is preferred when the oxidizing agent is air. Preferred oxidation catalysts are those of the metal soap type, such as manganese naphthenate, manganese soap of fatty acids, manganese soap of carboxylic acids obtained in previous oxidation of mineral oil, other manganese, barium, iron, magnesium soaps, etc.; mixed catalysts can be employed if desired. Preferably, means are provided to bring about intimate contact between the oxidation charge and the oxidizing agent; thus for example air as oxidizing agent can be introduced through a spider into a body of liquid oxidation charge, and passed upwardly therethrough in a large number of small bubbles to provide intimate contact.

The separation of strong acids from the weaker acids in the oxidation products can be accomplished in any suitable manner, for example fractional saponification of the acidic oxidation products, or fractional acidification of a saponification product obtained from the entire acid oxidation product. The latter procedure is preferred to fractional saponification, since saponification of the total oxidation product results in a desirable hydrolysis of esters in the oxidation product, to produce soaps of additional acids, which are then separated in the subsequent fractional acidification. The separation of the strong acids from the weaker acids can be carried out in the presence of a suitable diluent such as mineral oil. One satisfactory manner of operation involves the use as diluent of an oil which has suitable properties for subsequent incorporation in the drilling fluid, in order that the mixture of diluent and acids or soaps obtained in the separation, can be directly incorporated in the drilling fluid without removal of the diluent. Preferred temperatures for use in a fractional acidification operation are those in the approximate range from 75 to 100° C. In a fractional acidification or fractional saponification, the amount of acid or base respectively which is employed is preferably within the approximate range from 10 to 90%, more preferably 40 to 60%, of the stoichiometric amount required to acidify all of the soaps.

The separation of strong acids from weak acids which occurs in the operation previously described results in obtaining a strong acid fraction having higher dissociation constant on the average than the average dissociation constant of the total acids produced in the partial oxidation. Conversely, the weak acid fraction which is obtained has a lower dissociation constant on the average than the average dissociation constant of the total acid product from the oxidation.

The acids which are to be employed in the drilling fluid can be blended with the constituents of the drilling fluid, either in the free acid form or in the saponified form. Where more than one fraction of acids is to be incorporated in the drilling fluid, the blending of the fractions can be performed either in the free acid form or saponified form, and either before or after addition of the acids or soaps to the other constituents of the drilling fluid. Where one or more of the fractions obtained is to be added to a drilling fluid after the latter has been put into use, the addition may be performed either in the free acid or soap form. Where a weak acid fraction is thus added in order to decrease viscosity, it is preferably added in free acid form.

The oxidation products employed according to the invention can be employed in any suitable type of oil base or emulsion drilling fluid, and the proportions of constituents in such drilling fluids can be any suitable proportions as known in the art. Generally, in a straight oil base fluid, the water-immiscible liquid preferably constitutes about 35 to 55 weight percent of the fluid, the finely divided suspended solids about 25 to 45 weight percent, and the oxidation products about 5 to 15 weight percent. Where asphalt is employed in the drilling fluid, the asphalt is preferably about 15 to 25% of the amount of mineral oil, and the amount of soap employed is generally less than in an oil base fluid which does not contain asphalt. In an emulson fluid, the amount of water-immiscible liquid is generally about 10 to 60 weight percent of the fluid.

Suitable water-immiscible liquids for use in the drilling fluids according to the invention include petroleum materals such as crude oil, gas oil, kerosene, diesel oil, stove oil, and other types of materials such as coal tar distillates, vegetable or animal oils, alcohols, ketones, turpentine, etc. Preferred materials are petroleum crudes or fractions having A.P.I. gravity of 15 to 50, more preferably 25 to 40. Suitable finely divided solids, for use as weighting material include clay, bentonite, fuller's earth, ground shells, limestone, magnetite, hematite, barytes, lead sulfide, lead oxide, iron compounds, etc.

The oxidation products employed according to the invention can be used as the sole stabilizer in the fluid, or they can be used in conjunction with other known stabilizers such as tall oil, naphthenates, lamp black, etc. Other materials, known for use in drilling fluids, can also be added in order to promote the formation of a strong sheath on the wall of the well, for example mica, glass wool, sawdust, asbestos.

The following examples illustrate the invention:

*Example I*

A drilling fluid is prepared having the following composition by weight:

| | Parts |
|---|---|
| Petroleum oil (35° A.P.I.) | 50 |
| Barytes | 80 |
| Aqueous sodium hydroxide (50° Bé.) | 5 |
| Relatively weak carboxylic acids obtained by partial oxidation of petroleum | 5 |

The carboxylic acids employed in the composition are obtained by partially oxidizing a petroleum white oil having Saybolt Universal viscosity at 100° F. of about 200 seconds, the oxidation being performed at 140° C. and 50 p.s.i.g. by blowing air through the oil at a rate of about 500 cubic feet per minute, in the presence of about 100 percent, based on white oil charge, of oxidized white oil obtained from a previous oxidation. The oxidation is continued until the saponification number of the oxidation product is about 115 mg. of KOH per gram and the acid number about 55 mg. of KOH per gram. The total liquid oxidation product is saponified with aqueous sodium hydroxide at 80° C. to obtain about 150 volumes of aqueous solution of sodium soaps of carboxylic acid products of oxidation, the aqueous solution being then separated from the unoxidized oil and the unsaponifiable oxidation products. About 20 volumes of mineral oil as diluent are then added to the aqueous solution, and the resulting mixture is contacted with one volume of 55% aqueous sulfuric acid, the latter being one half the stoichiometric amount required for acidification of all the soaps. The resulting phases are separated at 80° C. to obtain about 35 volumes of an oil solution of weak acids liberated from the soap solution by the sulfuric acid, and about 135 volumes of an aqueous solution of soaps of the stronger acids, which soaps did not react with the sulfuric acid. The latter solution is then contacted with additional sulfuric acid in order to release the strong acids from the soaps, the contacting being performed in the presence of a mineral oil diluent, and the solution of the stronger acids in the diluent is subsequently separated from the aqueous phase. The solution of the weak acids is employed in the above drilling fluid composition in order to provide the 10% of acids specified in the above table. The resulting drilling fluid has lower viscosity than a corresponding drilling fluid prepared from the entire acidic oxidation product.

When, for any reason, it may subsequently be desired to increase the gel strength of the mud, a suitable amount of the mineral oil solution of strong acids is added to the fluid in order to increase its gel strength, and provide the desired properties for further use of the fluid. On the other hand, when, for any reason it may be desired to decrease the viscosity, a suitable amount of additional petroleum oil, or of additional relatively weak acids may be added to provide the desired properties.

*Example II*

A drilling fluid is prepared having the following composition by weight:

| | Parts |
|---|---|
| Petroleum oil (35° A.P.I.) | 40 |
| Calcium carbonate | 40 |
| Aqueous sodium hydroxide (50° Bé.) | 5 |
| Relatively strong carboxylic acids obtained by partial oxidation | 5 |

The carboxylic acids are prepared and separated from the other oxidation products in the manner described in Example I. The drilling fluid has greater gel strength than a corresponding drilling fluid prepared from the entire acidic oxidation product.

When, for any reason, it may subsequently be desired to decrease the viscosity of the mud, a suitable amount of additional petroleum oil, or of the mineral oil solution of relatively weak acids prepared as described in Example I is added in order to decrease the viscosity and provide the desired properties for further use of the fluid. On the other hand, when, for any reason, it may be desired to increase the gel strength, a suitable additional amount of soaps of the relatively strong acids may be added to provide the desired properties.

*Example III*

A drilling fluid of the emulsion type, having the following composition, is prepared:

| | Vol. percent |
|---|---|
| Aqueous clay suspension | 75 |
| Petroleum oil containing 0.5% soap of relatively strong acids and 1.5% soap of relatively weak acids | 25 |

The mixture of soaps employed is obtained by mixing in the indicated proportions the saponified weak acid fraction obtained as described in Example I with the saponified strong acid fraction also obtained as described in that example. The mixture obtained contains a greater proportion of the weak acids relative to the strong acids than the oxidation product prior to separation according to acid strength, which product contains approximately equal amounts of the respective types of acids. The drilling fluid of this example has lower viscosity than a corresponding drilling fluid prepared from the entire acidic oxidation product. Subsequently, additional petroleum oil or additional relatively weak acids may be added to decrease viscosity or additional soaps of relatively strong acids to increase gel strength, depending on the requirements of the particular case.

In suitable instances, the drilling fluid may initially contain or be modified to contain, a mixture containing a greater proportion of strong acids relative to weak acids than in the oxidation product prior to separation.

A weak acid fraction, as recited in the appended claims, refers to a fraction, either in free acid or saponified form, having in the acid form an average dissociation constant less than the average dissociation constant for the total acid product of the oxidation. A strong acid fraction refers to a fraction, either in free acid or saponified form, having in the acid form an average dissociation constant greater than the average dissociation constant for the total acid product of the oxidation.

In the preparation of oxidation products for use according to the invention, it is within the scope of the invention to obtain in the oxidation a ratio of acid number to saponification number as high as one. However, the ratio will generally be lower than that, e.g. as low as 0.1, because of the formation of esters, etc. in the oxidation.

In the practice of the present invention, it is preferred to separate unsaponifiable material from the saponifiable oxidation products, procedures for such separation being well known, and then separate the saponifiable products into fractions having different acid strength. However, it is within the scope of the invention to perform the latter separation in the presence of the unsaponifiable material in the oxidation product mixture, such material being ultimately incorporated, with the acidic material, in the drilling fluid. In any event, where fractional saponification is employed as the means of separation according to acid strength, the extent of saponification is less than that obtained in an ordinary saponification of petroleum oxidation products, which saponification is not for the purpose of separation according to acid strength and is generally an essentially complete saponification.

Drilling fluids according to the invention may if desired contain a small amount of free base, preferably not more than 5 volume percent. However, free base is not essential, and drilling fluids which do not contain free base are within the scope of the invention.

The invention claimed is:

1. In the drilling of a well by the rotary method, the steps which comprise utilizing in the drilling a drilling fluid comprising a water-immiscible suspending liquid, finely divided solid suspended material in amount sufficient to enable the fluid to overcome well pressure, and a minor amount sufficient to stabilize the suspension of a stabilizing material selected from the group consisting of a weak acid fraction separated from products of liquid phase partial oxidation of petroleum, a strong acid fraction separated from such products, and a mixture of such weak acid fraction and such strong acid fraction, the proportions of the respective fractions in the mixture being different from those in the oxidation product prior to separation, and regulating the viscosity of the drilling fluid by adding such weak acid fraction when the fluid thickens excessively, and by adding such strong acid fraction when the viscosity of the fluid becomes undesirably low.

2. Method according to claim 1 wherein said drilling fluid is an emulsion drilling fluid.

3. Method according to claim 1 wherein said stabilizing material is a mixture of said weak acid fraction and said strong acid fraction.

4. Method according to claim 1 wherein said stabilizing material contains a greater proportion of said strong acid fraction relative to said weak acid fraction than in the oxidation product prior to separation.

5. Method according to claim 1 wherein said stabilizing material contains a greater proportion of said weak acid fraction relative to said strong acid fraction than in the oxidation product prior to separation.

References Cited in the file of this patent

UNITED STATES PATENTS

| 2,361,547 | Jenkins | Oct. 31, 1944 |
| 2,573,959 | Fischer | Nov. 6, 1951 |